(12) United States Patent
Morooka et al.

(10) Patent No.: US 12,325,174 B2
(45) Date of Patent: Jun. 10, 2025

(54) FUEL TANK PRODUCTION APPARATUS AND FUEL TANK PRODUCTION METHOD

(71) Applicant: Yachiyo Industry Co., Ltd., Saitama (JP)

(72) Inventors: Kazuyoshi Morooka, Tochigi (JP); Toru Matsuzaki, Tochigi (JP)

(73) Assignee: YACHIYO INDUSTRY CO., LTD., Saitama (JP)

( * ) Notice: Subject to any disclaimer, the term of this patent is extended or adjusted under 35 U.S.C. 154(b) by 0 days.

(21) Appl. No.: 18/859,084

(22) PCT Filed: Apr. 3, 2023

(86) PCT No.: PCT/JP2023/013778
§ 371 (c)(1),
(2) Date: Oct. 22, 2024

(87) PCT Pub. No.: WO2023/210263
PCT Pub. Date: Nov. 2, 2023

(65) Prior Publication Data
US 2025/0108550 A1    Apr. 3, 2025

(30) Foreign Application Priority Data

Apr. 25, 2022 (JP) ................. 2022-071723

(51) Int. Cl.
*B29C 49/48* (2006.01)
*B29C 33/42* (2006.01)
(Continued)

(52) U.S. Cl.
CPC .......... *B29C 49/4823* (2013.01); *B29C 33/42* (2013.01); *B29C 49/4802* (2013.01);
(Continued)

(58) Field of Classification Search
CPC . B29C 49/04; B29C 49/4802; B29C 49/4812; B29C 49/4823;
(Continued)

(56) References Cited

U.S. PATENT DOCUMENTS

| | | |
|---|---|---|
| 4,170,622 A | 10/1979 | Uhlig |
| 2001/0018104 A1 | 8/2001 | Iwasaki |

(Continued)

FOREIGN PATENT DOCUMENTS

| | | |
|---|---|---|
| CN | 113165766 A | 7/2021 |
| JP | S57-165223 A | 10/1982 |

(Continued)

OTHER PUBLICATIONS

International Search Report and Written Opinion of the International Search Report for PCT/JP2023/013778 dated Jun. 13, 2023.

(Continued)

*Primary Examiner* — Jerzi H Moreno Hernandez
(74) *Attorney, Agent, or Firm* — KENEALY VAIDYA LLP (57) ABSTRACT

A fuel tank production apparatus includes a forming mold and a cooling mold. The forming mold has a protruding ridge portion on a molding surface thereof and is configured to form a primary molded article while forming a bead-shaped portion so as to provide a recess on an outer surface. The cooling mold is configured to cool the primary molded article while crushing the bead-shaped portion by cooling blow pressure and deforming the bead-shaped portion into a rib-shaped portion.

6 Claims, 6 Drawing Sheets

(51) Int. Cl.
  *B29C 49/20* (2006.01)
  *B29C 49/64* (2006.01)
  *B29L 31/00* (2006.01)
(52) U.S. Cl.
  CPC .. *B29C 2049/2013* (2013.01); *B29C 49/4812* (2022.05); *B29C 2049/4825* (2013.01); *B29C 2049/6606* (2022.05); *B29L 2031/7172* (2013.01)
(58) Field of Classification Search
  CPC .... B29C 2049/6606; B29C 2049/4825; B29C 2049/2013; B29C 33/42; B29L 2031/7172
  See application file for complete search history.

(56) References Cited

U.S. PATENT DOCUMENTS

| | | |
|---|---|---|
| 2005/0115054 A1 | 6/2005 | Brandner et al. |
| 2008/0038497 A1 | 2/2008 | Nemoto |
| 2013/0068377 A1 | 3/2013 | Essig |
| 2016/0052187 A1 | 2/2016 | Werner |
| 2022/0024105 A1 | 1/2022 | Yano et al. |

FOREIGN PATENT DOCUMENTS

| | | | | |
|---|---|---|---|---|
| JP | 05131531 A | * | 5/1993 | ............. B29C 49/64 |
| JP | H05-131531 A | | 5/1993 | |
| JP | H05-293879 A | | 11/1993 | |
| JP | H06-143396 A | | 5/1994 | |
| JP | 2001-239573 A | | 9/2001 | |
| JP | 2001-239574 A | | 9/2001 | |
| JP | 2006-015744 A | | 1/2006 | |
| JP | 2009113704 A | * | 5/2009 | |
| JP | 2016-117260 A | | 6/2016 | |
| JP | 2018-058244 A | | 4/2018 | |
| JP | 2019-025876 A | | 2/2019 | |

OTHER PUBLICATIONS

Notice of Reasons for Refusal for the related Japanese Patent Application No. 2024-517925 dated Aug. 6, 2024.
Chinese Office Action for the related Chinese Patent Application No. 202380031040. dated Jan. 23, 2025.

* cited by examiner

FUEL TANK PRODUCTION APPARATUS AND FUEL TANK PRODUCTION METHOD

CROSS-REFERENCE TO RELATED APPLICATION

This application is a U.S. National Stage Application under 35 U.S.C § 371 of International Patent Application No. PCT/JP2023/013778 filed on 3 Apr. 2023, and claims priority under 35 U.S.C. § 119 to Japanese Patent Application No. 2022-071723 filed on 25 Apr. 2022, the disclosures of which are hereby incorporated by reference in their entirety.

TECHNICAL FIELD

The present invention relates to a fuel tank production apparatus and a fuel tank production method.

BACKGROUND ART

Patent Literature 1 discloses a blow mold with a pair of opposing sliders. In a fuel tank production method using this blow mold, a pair of sliders press a parison into the mold cavity and weld opposing portions of the parison together. After the pair of sliders are moved out of the mold cavity, ribs are formed by deformation due to blowing pressure.

CITATION LIST

Patent Literature

Patent Literature 1: US 2016/0052187 A1

SUMMARY OF INVENTION

Technical Problem

The production method disclosed in Patent Literature 1 requires a pair of sliders in the blow mold to form ribs inside the fuel tank. As a result, the structure and control of the blow mold become more complex, leading to higher cost and longer production cycle time.

In view of this, the present invention has been conceived, and an object of the present invention is to reduce production cost and production cycle time when producing a fuel tank with a rib-shaped portion.

Solution to Problem

In order to solve the above problem, the present invention provides a fuel tank production apparatus comprising a forming mold and a cooling mold, wherein the forming mold has a protruding ridge portion on a molding surface thereof and is configured to form a primary molded article while forming a bead-shaped portion so as to provide a recess on an outer surface, and the cooling mold is configured to cool the primary molded article while crushing the bead-shaped portion by cooling blow pressure and deforming the bead-shaped portion into a rib-shaped portion.

The present invention also provides a method of producing a fuel tank, comprising the steps of: a forming step of forming a primary molded article while forming a bead-shaped portion so as to provide a recess on an outer surface; and a cooling step of placing the primary molded article formed in the forming step in a cooling mold, followed by performing cooling blow, wherein in the cooling step, the primary molded article is cooled while the bead-shaped portion is crushed and deformed into a rib-shaped portion by cooling blow pressure.

According to the present invention, it is possible to form a rib-shaped portion inside a fuel tank with a simple structure, without the need to provide a complicated structure such as a slider in the forming mold. Further, since no slider or similar component is used, it is possible to omit the steps of pushing the slider into the fuel tank and retracting it during molding to form the rib-shaped portion. This results in a reduction in production cost and a shortening of the production cycle time. Further, the rib-shaped portion occupies less volume inside the fuel tank compared to the bead-shaped portion, so that the capacity of the fuel tank is less likely to be reduced.

It is preferable that the cooling mold includes a negative pressure unit and that the negative pressure unit generates negative pressure on the bead-shaped portion from an outer surface of the primary molded article and deforms the bead-shaped portion such that side walls of the bead-shaped portion are in close proximity to each other.

Further, it is preferable that a negative pressure unit is provided in the cooling mold and that in the cooling step, the negative pressure unit generates negative pressure on the bead-shaped portion from an outer surface of the primary molded article and deforms the bead-shaped portion such that side walls of the bead-shaped portion are in close proximity to each other.

According to the present invention, the forming accuracy of the rib-shaped portion can be improved.

It is preferable that the cooling mold deforms the bead-shaped portion into the rib-shaped portion at a temperature that is lower than the melting point of the primary molded article and that allows for deformation of the bead-shaped portion.

Further, it is preferable that the cooling step comprises deforming the bead-shaped portion into the rib-shaped portion at a temperature that is lower than the melting point of the primary molded article and that allows for deformation of the bead-shaped portion.

In this way, the deformation from the bead-shaped portion to the rib-shaped portion can be optimized.

Advantageous Effects of Invention

According to the present invention, it is possible to reduce production cost and production cycle time when producing a fuel tank with a rib-shaped portion.

DESCRIPTION OF EMBODIMENTS

A fuel tank production apparatus and a fuel tank production method according to a first embodiment of the present invention will be described with reference to the drawings. The following embodiments are merely examples, and do not limit the present invention. The embodiments may be combined as appropriate.

First Embodiment

<Fuel Tank>

Figure 1:
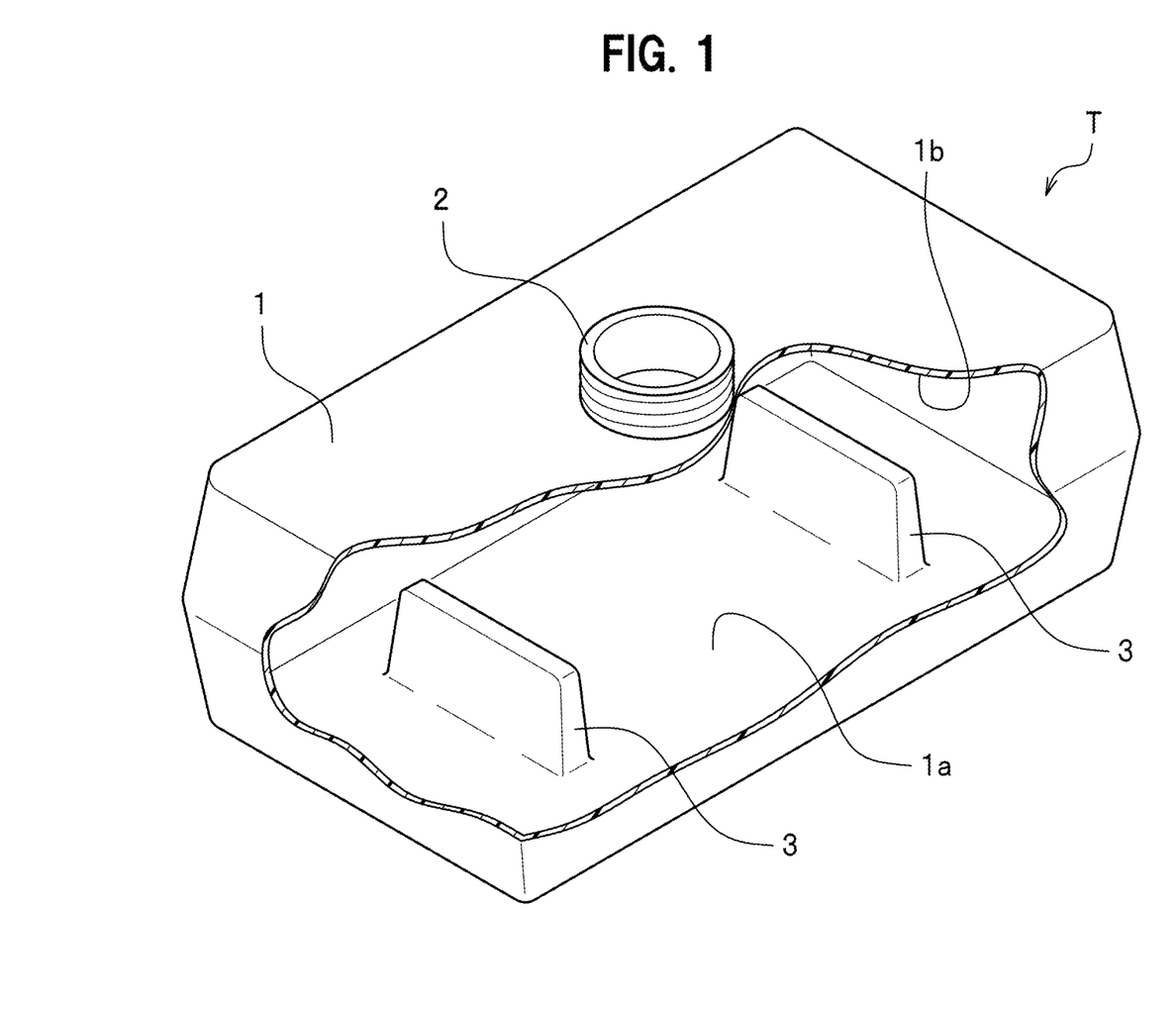
FIG. 1 is a perspective view of a fuel tank according to a first embodiment, showing the interior of the fuel tank as seen through from above.

FIG. 1 is a perspective view of a fuel tank according to a first embodiment, showing the interior of the fuel tank as seen through from above. A fuel tank T shown in FIG. 1 is made of plastic. The fuel tank T stores fuel such as gasoline therein, and is mounted on a vehicle such as an automobile, a motorcycle, and a vessel. The fuel tank T is a thin type that is wide and thin in the vertical direction. The fuel tank T is formed of a thermo-plastic material including a barrier layer.

The fuel tank T includes a fuel tank body 1, a pump mounting hole 2 and rib-shaped portions 3, 3. The pump mounting hole 2 has a cylindrical shape and is formed to penetrate through a top surface 1b of the fuel tank body 1. A pump (not shown) for pumping fuel out of the fuel tank T is mounted on the pump mounting hole 2.

The rib-shaped portions 3, 3 are plate-shaped portions that rise from a bottom surface 1a of the fuel tank body 1 and extends upward. The shape of the rib-shaped portions 3, 3 is not particularly limited, but in this embodiment, they are rectangular in both side view and plan view. The rib-shaped portions 3, 3 enhance the deformation resistance and strength of the fuel tank T, and help to prevent fuel sloshing (eliminate waves when the fuel rocks). Other internal components may also be provided inside the fuel tank body 1.

<Fuel Tank Production Apparatus>

Figure 2:
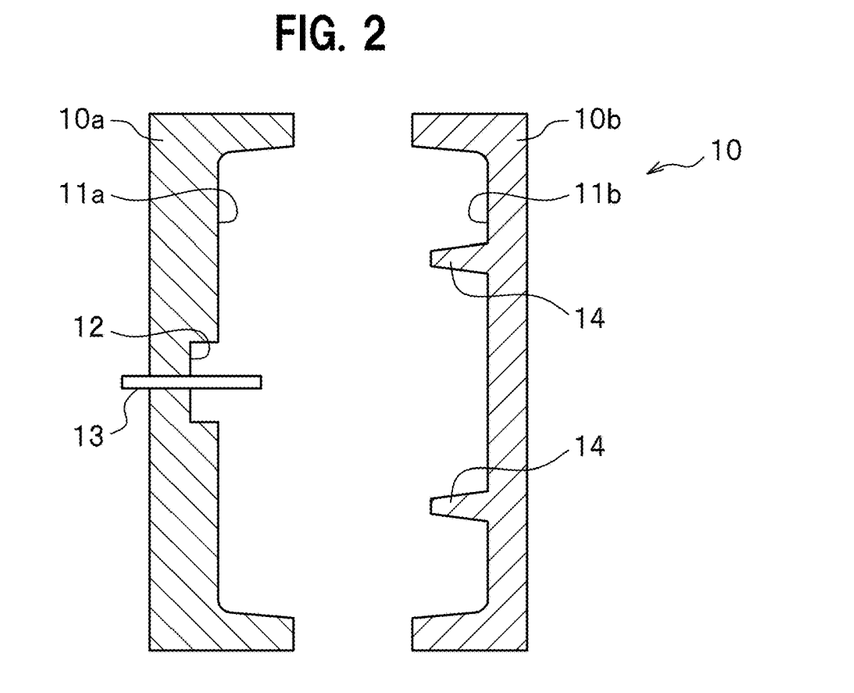
FIG. 2 is a cross-sectional view showing a forming mold of a fuel tank production apparatus according to the first embodiment.
Figure 3:
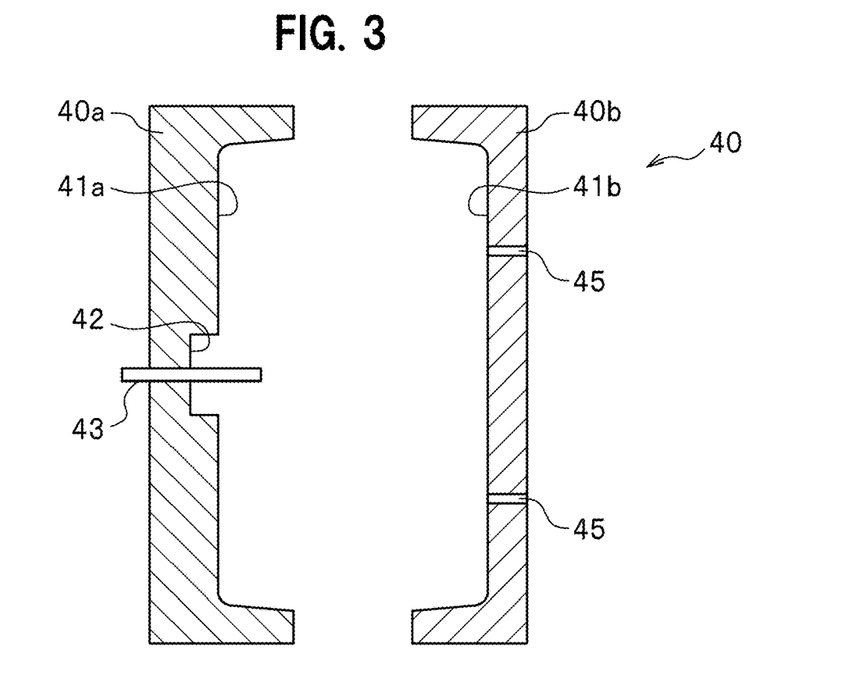
FIG. 3 is a cross-sectional view showing a cooling mold of the fuel tank production apparatus according to the first embodiment.

A fuel tank production apparatus according to this embodiment includes a forming mold 10 shown in FIG. 2 and a cooling mold 40 shown in FIG. 3. The forming mold 10 and the cooling mold 40 are electrically connected to a control unit (not shown), and can be operated based on a signal from the control unit to produce a fuel tank T.

As shown in FIG. 2, the forming mold 10 includes a first forming mold 10a and a second forming mold 10b. The first forming mold 10a has a molding surface 11a, a hole portion forming surface 12, and a blow pin 13. The molding surface 11a is a portion for molding the fuel tank body 1. The hole portion forming surface 12 is a portion for molding the pump mounting hole 2. The blow pin 13 is a pipe for supplying air during molding.

The second forming mold 10b is disposed to face the molding surface 11a. The second forming mold 10b has a molding surface 11b and protruding ridge portions 14, 14. The molding surface 11b is a portion for molding the fuel tank body 1. Each protruding ridge portion 14 extends from the molding surface 11b toward the first forming mold 10a. The protruding ridge portion 14 is a portion for molding a bead-shaped portion 21 to be described later. The protruding ridge portion 14 is trapezoidal in cross-section and has a plate shape. The protruding ridge portion 14 is inclined such that it widens from the distal end toward the proximal end, allowing a primary molded article 30 to be described later to be removed (separated) from the second forming mold 10b during demolding.

As shown in FIG. 3, the cooling mold 40 includes a first cooling mold 40a and a second cooling mold 40b. The first cooling mold 40a has an opposing surface 41a, a hole portion opposing surface 42, and a blow pin 43. The opposing surface 41a is a portion where an outer surface of the fuel tank body 1 faces. The hole portion opposing surface 42 is a portion where the pump mounting hole 2 faces. The blow pin 43 is a pipe for supplying air during cooling.

The second cooling mold 40b is disposed to face the opposing surface 41a. The second cooling mold 40b has an opposing surface 41b and a plurality of communication holes 45. The opposing surface 41b is a portion where the outer surface of the fuel tank body 1 faces. The communication hole 45 is a hole that communicates from the opposing surface 41b to the outside. The communication holes 45 and a suction machine (not shown) constitute a negative pressure unit. The negative pressure unit generates negative pressure from the outer surface of the fuel tank body 1 to bead-shaped portions 21 to be described later, and deforms the bead-shaped portions 21 such that side walls thereof are in close proximity to each other. In other words, the negative pressure unit is a device for promoting the deformation of the bead-shaped portions 21. The first cooling mold 40a and the second cooling mold 40b generally have the same configuration as the first forming mold 10a and the second forming mold 10b, except for the presence of the protruding ridge portions 14 and the communication holes 45.

<Fuel Tank Production Method>

In a fuel tank production method, a parison placement step, a forming step, a demolding step (after molding), a setting step, a cooling step, and a demolding step (after cooling) are performed.

Figure 4:
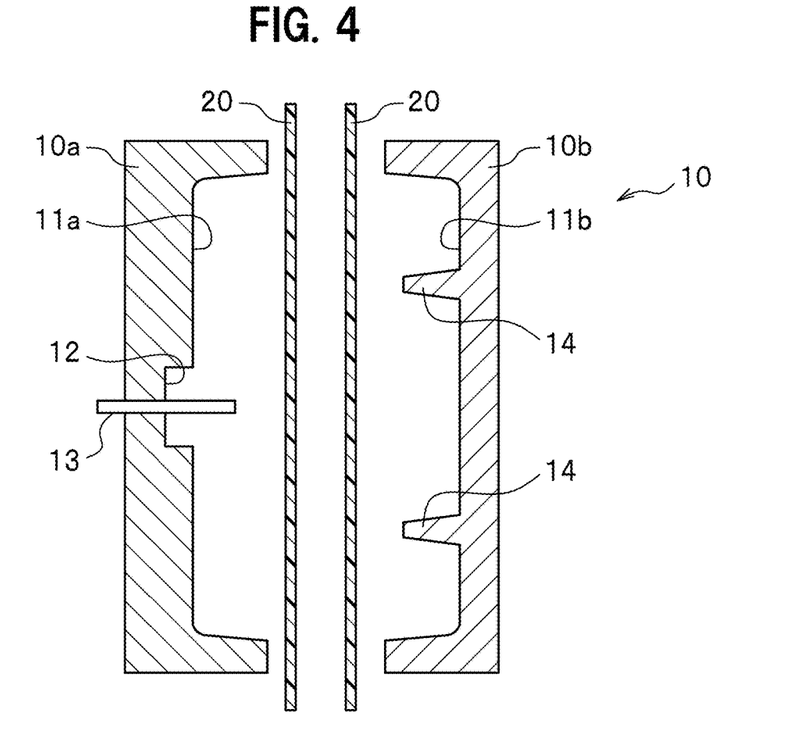
FIG. 4 is a cross-sectional view showing a parison placement step of a fuel tank production method according to the first embodiment.

As shown in FIG. 4, the parison placement step is a process of placing a sheet-like parison 20, 20 between the first forming mold 10a and the second forming mold 10b. The parison 20 is a thermo-plastic material including a barrier layer, and is a material constituting the fuel tank body 1. The parison 20 has a temperature equal to or higher than the melting point of this thermo-plastic material and is deformable (moldable). The parison 20 may be cylindrical in shape.

Figure 5:
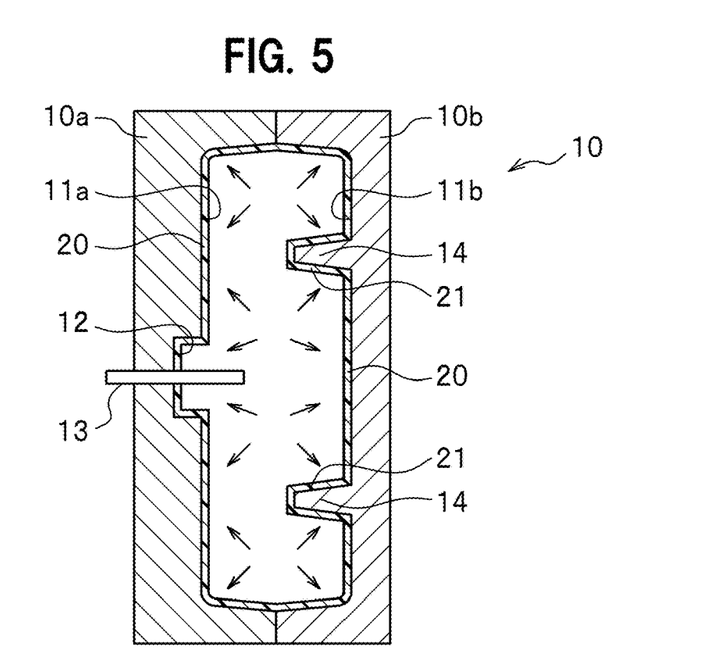
FIG. 5 is a cross-sectional view showing a forming step of the fuel tank production method according to the first embodiment.

As shown in FIG. 5, the forming step is a process of performing blow molding using the forming mold 10. In the forming step, the first forming mold 10a and the second forming mold 10b are clamped, and air is supplied to the inside of the forming mold 10 through the blow pin 13. Blow pressure acts from the inside to the outside of the parison 20 by the forming step, so that the parison 20 is transferred to the molding surfaces 11a, 11b, the hole portion forming surface 12, and the protruding ridge portions 14 and molding is performed. The bead-shaped portions 21, 21 are formed by the protruding ridge portions 14, 14. Each bead-shaped portion 21 has a trapezoidal cross-section and a plate shape.

Figure 6:
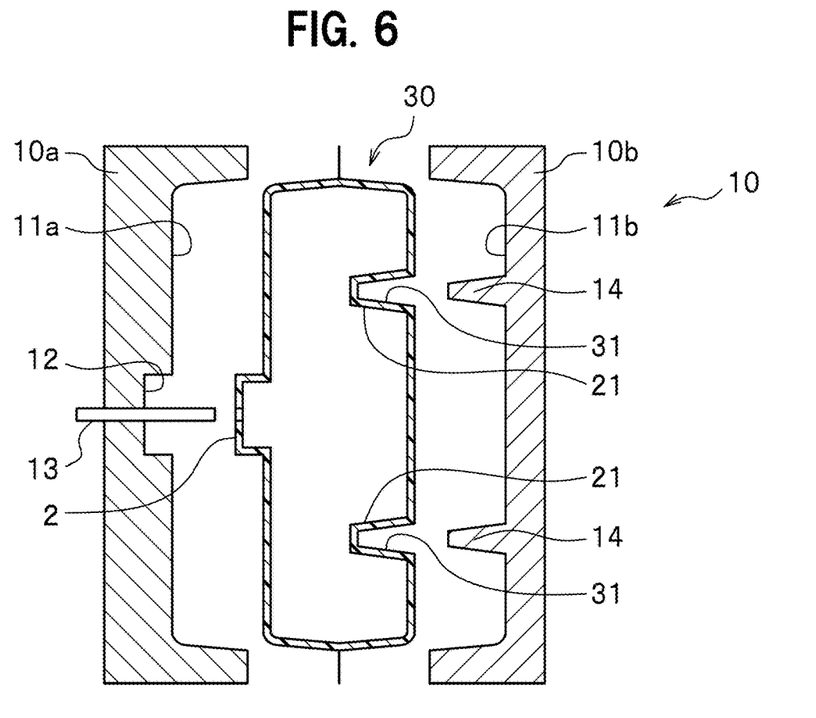
FIG. 6 is a cross-sectional view showing a demolding step (after molding) of the fuel tank production method according to the first embodiment.

As shown in FIG. 6, the demolding step (after molding) is a process of separating the first forming mold 10*a* and the second forming mold 10*b* from each other. By this process, a primary molded article 30 having a hollow interior is formed. Recesses 31, 31 are formed on the outer surface of the primary molded article 30 at positions corresponding to the bead-shaped portions 21, 21.

Figure 7:
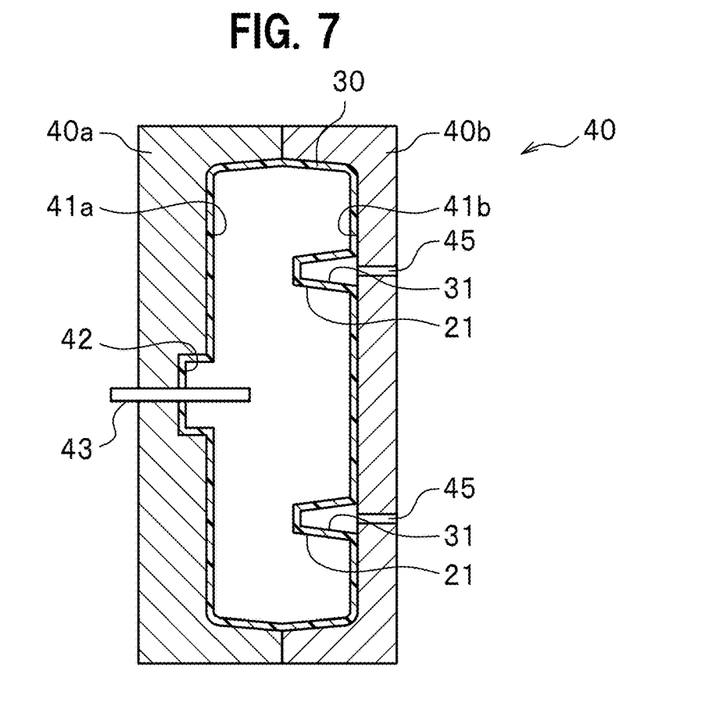
FIG. 7 is a cross-sectional view showing a setting step of the fuel tank production method according to the first embodiment.

As shown in FIG. 7, the setting step is a process of setting the primary molded article 30 inside the first cooling mold 40*a* and the second cooling mold 40*b*. The outer surface of the primary molded article 30 is placed to face the opposing surfaces 41*a*, 41*b* and the hole portion opposing surface 42. A space is formed between the opposing surface 41*b* and the recesses 31.

Figure 8:
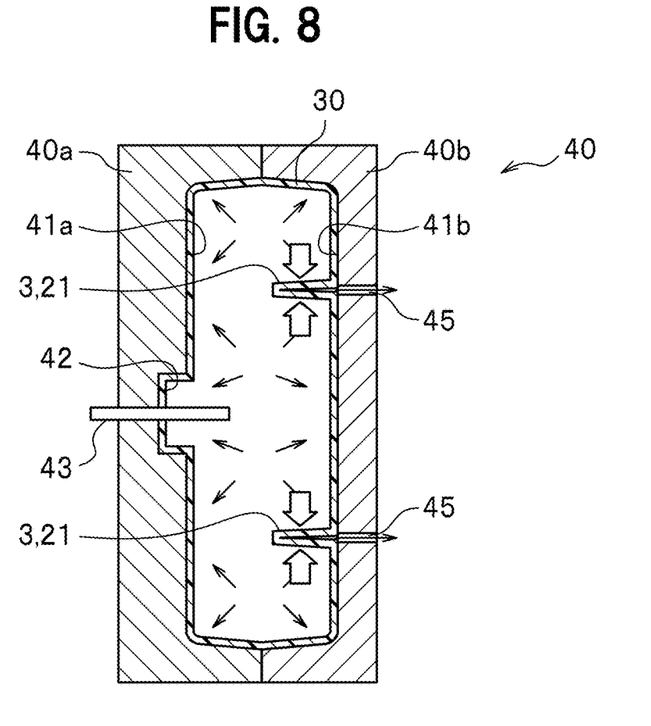
FIG. 8 is a cross-sectional view showing a cooling step of the fuel tank production method according to the first embodiment.

As shown in FIG. 8, the cooling step is a process of performing cooling blow using the cooling mold 40. In the cooling step, air is supplied to the inside of the primary molded article 30 through the blow pin 43. The temperature of the air may be set as appropriate, and may be the same as or lower than the temperature used during blow molding. The primary molded article 30 at this time has a temperature that is lower than the melting point of the primary molded article (parison) 30 and that allows for deformation. Since cooling blow pressure acts from the inside to the outside of the primary molded article 30 in the cooling step, side walls constituting the bead-shaped portion 21 are pressed in a direction in which they are in close proximity to each other (see the hollow arrows) and the rib-shaped portion 3 is formed. In other words, the bead-shaped portion 21 is crushed in a direction in which the side walls are in close proximity to each other while the height of the bead-shaped portion 21 is substantially unchanged, so that the rib-shaped portion 3 is formed. Further, since the air in the recesses 31 is sucked through the communication holes 45 of the negative pressure unit while performing the cooling blow, the bead-shaped portion 21 is easily deformed in a direction in which the side walls thereof approach each other.

Figure 9:
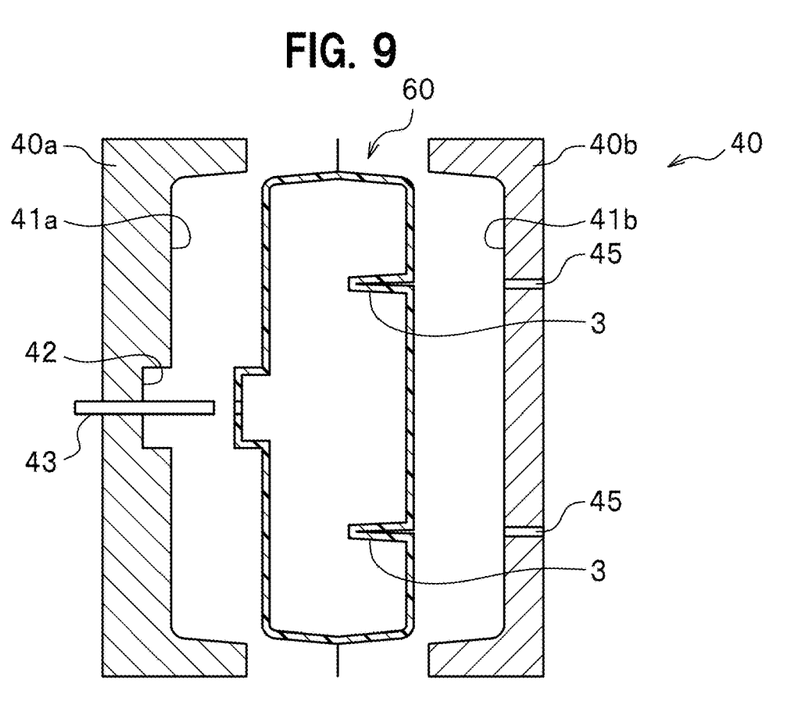
FIG. 9 is a cross-sectional view showing a demolding step (after cooling) of the fuel tank production method according to the first embodiment.

As shown in FIG. 9, the demolding step (after cooling) is a process of separating the first cooling mold 40*a* and the second cooling mold 40*b* from each other. By this process, a secondary molded article 60 is formed. The fuel tank T is finally formed after cutting off burrs.

According to the above-described fuel tank production apparatus and fuel tank production method in this embodiment, it is possible to form the rib-shaped portions 3, 3 inside the fuel tank T with a simple structure, without the need to provide a complicated structure such as a slider in the forming mold 10. Further, since no slider is used, it is possible to omit the steps of pushing the slider into the fuel tank T (primary molded article 30) and retracting it during molding to form the rib-shaped portions 3, 3. This results in a reduction in production cost and a shortening of the production cycle time. Further, since the rib-shaped portions 3, 3 occupy less volume inside the fuel tank T compared to the bead-shaped portions 21, 21, the capacity of the fuel tank T is less likely to be reduced.

Further, since the cooling mold 40 includes the negative pressure unit, the deformation of the bead-shaped portions 21 can promoted. This can improve the forming accuracy of the rib-shaped portion 3.

Further, in the cooling mold 40, the bead-shaped portions 21 are deformed into the rib-shaped portions at a temperature that is lower than the melting point of the primary molded article 30 and that allows for deformation of the bead-shaped portions 21. This can optimize the deformation from the bead-shaped portions 21 to the rib-shaped portions 3.

Second Embodiment

Next, a fuel tank production apparatus and a fuel tank production method according to a second embodiment will be described. The second embodiment is different from the first embodiment mainly in that the rib-shaped portions 3 are provided on the bottom surface of the fuel tank body 1, and the rib-shaped portions 4 are provided on the top surface of the fuel tank body 1, with the rib-shaped portions 3 and the rib-shaped portions 4 aligned and abutted against each other. When describing the second embodiment, descriptions that are duplicated from the first embodiment are omitted, and only the differences are described.

Figure 10:
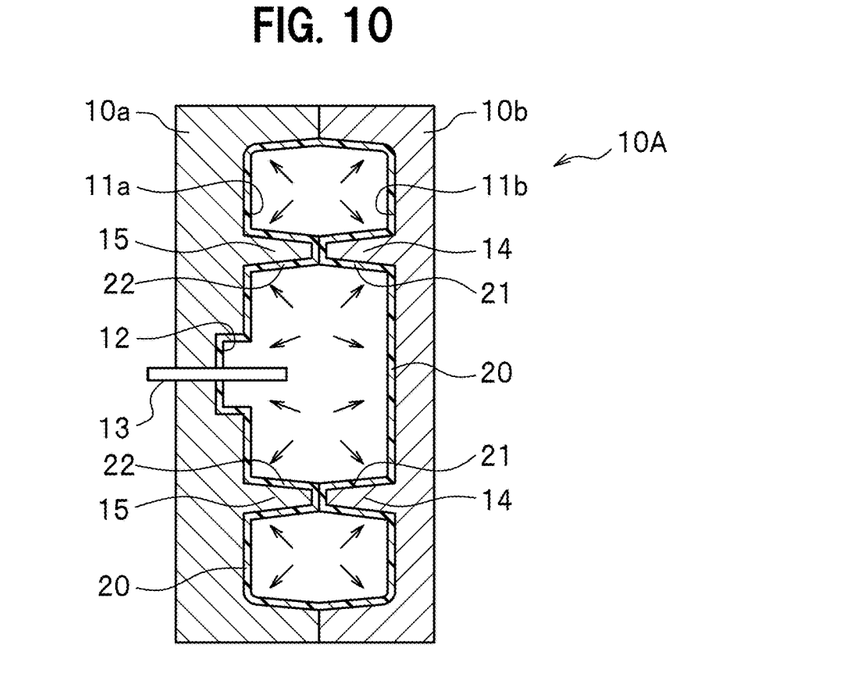
FIG. 10 is a cross-sectional view showing a forming step of a fuel tank production method according to a second embodiment.

FIG. 10 is a cross-sectional view showing a forming step of a fuel tank production method according to a second embodiment.

Figure 11:
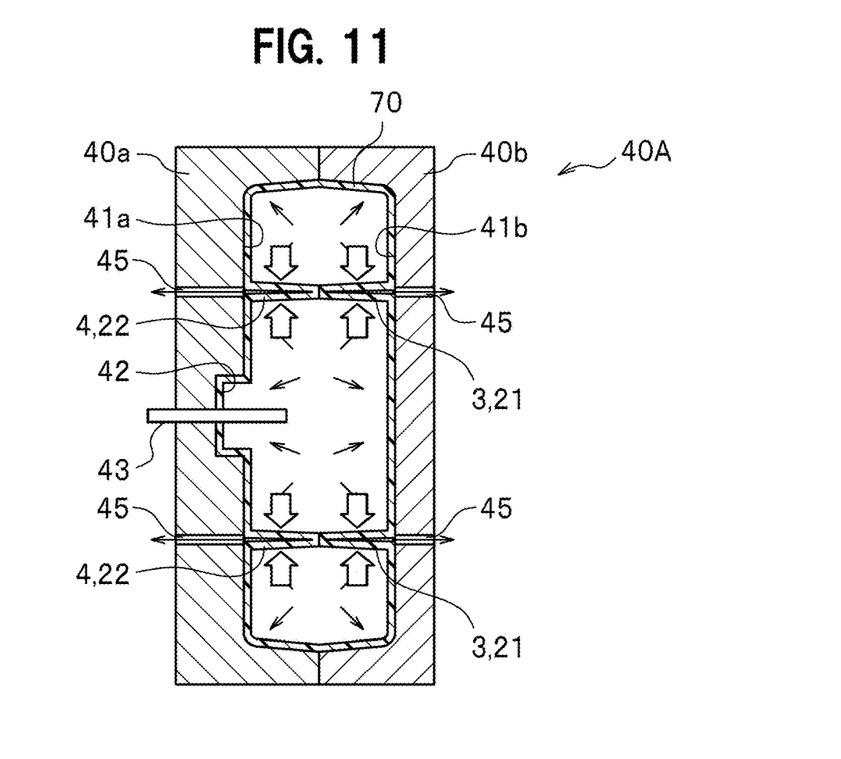
FIG. 11 is a cross-sectional view showing a cooling step of the fuel tank production method according to the second embodiment.

FIG. 11 is a cross-sectional view showing a cooling step of the fuel tank production method according to the second embodiment. A fuel tank production apparatus according to this embodiment includes a forming mold 10A and a cooling mold 40A.

As shown in FIG. 10, the forming mold 10A includes the first forming mold 10*a* and the second forming mold 10*b*. The first forming mold 10*a* has the molding surface 11*a*, the hole portion forming surface 12, the blow pin 13, and protruding ridge portions 15, 15. Each protruding ridge portion 15 extends from the molding surface 11*a* toward the second forming mold 10*b*. The protruding ridge portion 15 is a portion for molding a bead-shaped portion 22 to be described later. The protruding ridge portion 15 is trapezoidal in cross-section and has a plate shape. The protruding ridge portions 15, 15 are provided at positions opposite to the protruding ridge portions 14, 14. In the meantime, the second forming mold 10*b* is the same as that of the first embodiment.

As shown in FIG. 11, the cooling mold 40A includes the first cooling mold 40*a* and the second cooling mold 40*b*. The first cooling mold 40*a* has the opposing surface 41*a*, the hole portion opposing surface 42, the blow pin 43, and communication holes 45. The communication hole 45 is a hole that communicates from the opposing surface 41*a* to the outside. The communication holes 45 and a suction machine (not shown) constitute the negative pressure unit. The negative pressure unit generates negative pressure from the outer surface of the fuel tank body 1 to the bead-shaped portions 22, and deforms the bead-shaped portions 22 such that side walls thereof are in close proximity to each other. In other words, the negative pressure unit is a device for promoting the deformation of the bead-shaped portions 22. In the meantime, the second cooling mold 40*b* is the same as that of the first embodiment.

<Fuel Tank Production Method>

In a fuel tank production method according to this embodiment, a parison placement step, a forming step, a demolding step (after molding), a setting step, a cooling step, and a demolding step (after cooling) are performed. It should be noted that the parison placement step, the demolding step (after molding), the setting step, and the demolding step (after cooling) are the same as those of the first embodiment.

As shown in FIG. 10, the forming step is a process of performing blow molding using the forming mold 10A. In the forming step, the first forming mold 10*a* and the second forming mold 10b are clamped, and air is supplied to the inside of the forming mold 10A through the blow pin 13. Blow pressure acts from the inside to the outside of the parison 20 by the forming step, so that the parison 20 is transferred to the molding surfaces 11a, 11b, the hole portion forming surface 12, and the protruding ridge portions 14, 15 and molding is performed. The bead-shaped portions 21, 21, 22, 22 are formed by the forming step. The bead-shaped portions 21, 22 that are opposite to each other are in contact with each other.

As shown in FIG. 11, the cooling step is a process of performing cooling blow using the cooling mold 40A. In the cooling step, air is supplied to the inside of the primary molded article 70 through the blow pin 43. The temperature of the air may be set as appropriate, and may be the same as or lower than the temperature used during blow molding. The primary molded article 70 at this time has a temperature that is lower than the melting point of the primary molded article (parison) and that allows for deformation. Since cooling blow pressure acts from the inside to the outside of the primary molded article 70 in the cooling step, side walls constituting the bead-shaped portions 21, 22 are pressed in a direction in which they are in close proximity to each other (see the hollow arrows) and the rib-shaped portions 3, 4 are formed. Further, since the air is sucked from the outer surface of the primary molded article 70 by the negative pressure unit while performing the cooling blow, the bead-shaped portions 21, 22 are easily deformed in a direction in which the side walls thereof approach each other.

According to the second embodiment described above, substantially the same advantageous effects as those of the first embodiment are obtained. In particular, according to the second embodiment, it is possible to form the rib-shaped portions 3, 4 opposite to each other in the upper-lower direction with a simple structure, without the need to provide a complicated structure such as a slider in the forming mold. Since the rib-shaped portions 3, 4 abut against each other, the strength and deformation resistance of the fuel tank T can be further enhanced.

Although the embodiments of the present invention have been described above, various design modifications can be made as appropriate without departing from the gist of the present invention. For example, if the rib-shaped portions can be formed, the negative pressure unit may be omitted. In the second embodiment, the rib-shaped portions 3, 4 are designed to abut against each other, but they can be spaced apart from each other.

REFERENCE SIGNS LIST

T fuel tank
1 fuel tank body
1a bottom surface
1b top surface
2 pump mounting hole
3, 4 rib-shaped portion
10 forming mold
11a, 11b molding surface
13 blow pin
14 protruding ridge portion
15 protruding ridge portion
20 parison
21, 22 bead-shaped portion
30, 70 primary molded article
31 recess
40 cooling mold
41a, 41b opposing surface
43 blow pin

The invention claimed is:

1. A fuel tank production apparatus comprising a forming mold and a cooling mold, wherein
the forming mold has a protruding ridge portion on a molding surface thereof and is configured to form a primary molded article while forming a bead-shaped portion so as to provide a recess on an outer surface, and
the cooling mold is configured to cool the primary molded article while crushing the bead-shaped portion by cooling blow pressure and deforming the bead-shaped portion into a rib-shaped portion.

2. The fuel tank production apparatus according to claim 1, wherein
the cooling mold includes a negative pressure unit, and
the negative pressure unit generates negative pressure on the bead-shaped portion from an outer surface of the primary molded article and deforms the bead-shaped portion such that side walls of the bead-shaped portion are in close proximity to each other.

3. The fuel tank production apparatus according to claim 1, wherein
the cooling mold deforms the bead-shaped portion into the rib-shaped portion at a temperature that is lower than the melting point of the primary molded article and that allows for deformation of the bead-shaped portion.

4. A method of producing a fuel tank, comprising the steps of:
a forming step of forming a primary molded article while forming a bead-shaped portion so as to provide a recess on an outer surface; and
a cooling step of placing the primary molded article formed in the forming step in a cooling mold, followed by performing cooling blow,
wherein in the cooling step, the primary molded article is cooled while the bead-shaped portion is crushed and deformed into a rib-shaped portion by cooling blow pressure.

5. The method according to claim 4, wherein
a negative pressure unit is provided in the cooling mold, and
in the cooling step, the negative pressure unit generates negative pressure on the bead-shaped portion from an outer surface of the primary molded article and deforms the bead-shaped portion such that side walls of the bead-shaped portion are in close proximity to each other.

6. The method according to claim 4, wherein
the cooling step comprises deforming the bead-shaped portion into the rib-shaped portion at a temperature that is lower than the melting point of the primary molded article and that allows for deformation of the bead-shaped portion.

* * * * *